(12) United States Patent
O'Donovan

(10) Patent No.: US 10,068,179 B2
(45) Date of Patent: Sep. 4, 2018

(54) POSITIONING TEXT IN DIGITAL DESIGNS BASED ON AN UNDERLYING IMAGE

(71) Applicant: Adobe Systems Incorporated, San Jose, CA (US)

(72) Inventor: Peter O'Donovan, Seattle, WA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 0 days.

(21) Appl. No.: 14/937,619

(22) Filed: Nov. 10, 2015

(65) Prior Publication Data
US 2017/0032553 A1 Feb. 2, 2017

Related U.S. Application Data

(60) Provisional application No. 62/198,537, filed on Jul. 29, 2015.

(51) Int. Cl.
| | |
|---|---|
| *G06T 11/60* | (2006.01) |
| *G06N 7/00* | (2006.01) |
| *G06F 3/0484* | (2013.01) |
| *G06K 9/00* | (2006.01) |
| *G06T 11/00* | (2006.01) |
| *G06F 3/0488* | (2013.01) |
| *G11B 27/031* | (2006.01) |
| *G06K 9/62* | (2006.01) |

(52) U.S. Cl.
CPC .......... *G06N 7/005* (2013.01); *G06F 3/0484* (2013.01); *G06F 3/0488* (2013.01); *G06F 3/04842* (2013.01); *G06K 9/00221* (2013.01); *G06K 9/00463* (2013.01); *G06K 9/6215* (2013.01); *G06K 9/6271* (2013.01); *G06T 11/001* (2013.01); *G06T 11/60* (2013.01); *G11B 27/031* (2013.01); *G06T 2207/10016* (2013.01); *G06T 2207/10024* (2013.01)

(58) Field of Classification Search
CPC .............. G06F 3/0484; G06F 3/04842; G06F 3/04845; G06T 11/60
See application file for complete search history.

(56) References Cited

U.S. PATENT DOCUMENTS

| | | | |
|---|---|---|---|
| 6,298,157 B1 * | 10/2001 | Wilensky | ............... G06T 3/403 382/199 |
| 6,809,741 B1 | 10/2004 | Bates et al. | |
| 8,041,111 B1 | 10/2011 | Wilensky | |

(Continued)

OTHER PUBLICATIONS

U.S. Appl. No. 14/942,503, dated Oct. 4, 2016, Preinterview 1st OA.

(Continued)

*Primary Examiner* — Diane Wills
(74) *Attorney, Agent, or Firm* — Keller Jolley Preece

(57) ABSTRACT

The present disclosure is directed toward systems and methods for determining the optimal placement, color, and size of an overlay in a digital design. For example, in response to determining that a change to an underlying image of a digital design has caused a loss of readability and/or aesthetic value in the digital design due to the placement of the overlay over the now changed underlying image, one or more embodiments described herein utilize a scoring system to identify optimal placement, color, and size for the overlay in relation to the underlying image in the digital design.

20 Claims, 10 Drawing Sheets

(56) References Cited

U.S. PATENT DOCUMENTS

| | | | |
|---|---|---|---|
| 8,416,255 B1 | 4/2013 | Gilra | |
| 8,849,043 B2 | 9/2014 | Ptucha et al. | |
| 8,849,853 B2 | 9/2014 | Ptucha et al. | |
| 8,872,969 B1 | 10/2014 | Rathi et al. | |
| 9,639,969 B1 | 5/2017 | Wilson et al. | |
| 2003/0063130 A1 | 4/2003 | Barbieri et al. | |
| 2004/0196298 A1* | 10/2004 | Nagahashi | G06T 11/60 345/619 |
| 2005/0195331 A1 | 9/2005 | Sugano et al. | |
| 2011/0026835 A1 | 2/2011 | Ptucha et al. | |
| 2011/0157226 A1 | 6/2011 | Ptucha et al. | |
| 2011/0261994 A1 | 10/2011 | Cok | |
| 2011/0261995 A1 | 10/2011 | Cok | |
| 2011/0273474 A1* | 11/2011 | Iwayama | H04N 5/23219 345/636 |
| 2013/0198617 A1* | 8/2013 | Maloney | G06F 17/30056 715/252 |
| 2014/0359656 A1 | 12/2014 | Banica et al. | |
| 2015/0002696 A1 | 1/2015 | He et al. | |
| 2015/0379000 A1 | 12/2015 | Haitani et al. | |
| 2016/0093080 A1* | 3/2016 | Tumanov | G06T 11/60 345/589 |
| 2016/0142625 A1* | 5/2016 | Weksler | H04N 5/23222 348/222.1 |
| 2016/0148343 A1* | 5/2016 | Yan | G06T 7/11 345/660 |
| 2017/0032269 A1 | 2/2017 | Portilla et al. | |
| 2017/0032542 A1 | 2/2017 | Shankar et al. | |
| 2017/0032554 A1 | 2/2017 | O'Donovan et al. | |

OTHER PUBLICATIONS

U.S. Appl. No. 14/942,503, dated Jan. 23, 2017, 1st Action Interview OA Summary.
U.S. Appl. No. 14/947,683, dated Sep. 26, 2017, Office Action.
U.S. Appl. No. 14/942,503, dated May 31, 2017, Office Action.
U.S. Appl. No. 14/947,683, dated Jun. 28, 2017, Preinterview 1st OA.
U.S. Appl. No. 14/942,503, Feb. 20, 2018, Office Action.
U.S. Appl. No. 14/947,683, Jan. 22, 2018, Office Action.

* cited by examiner

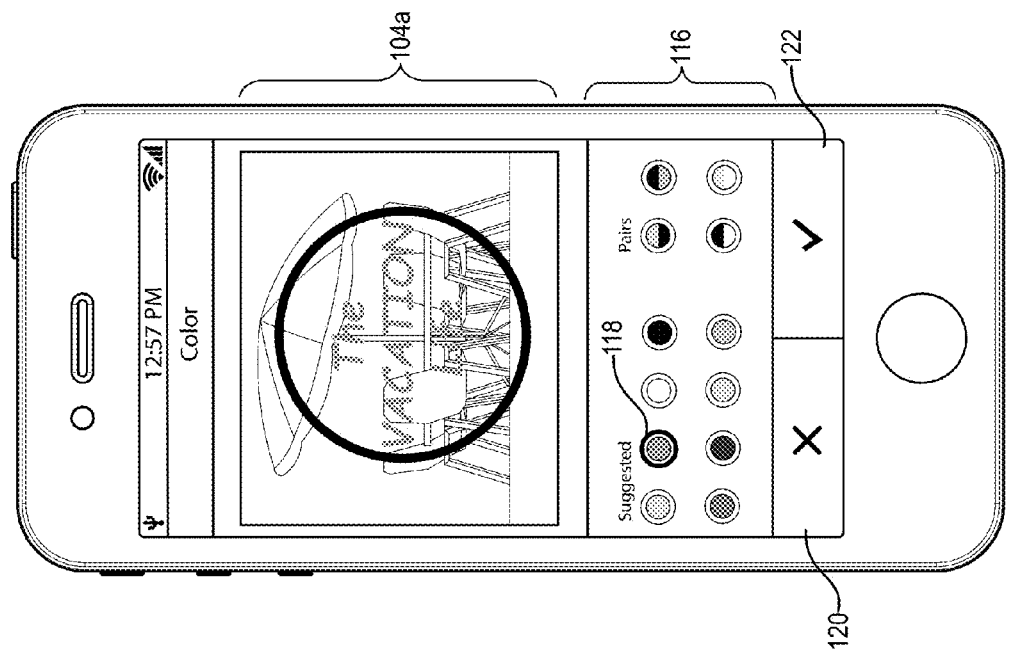
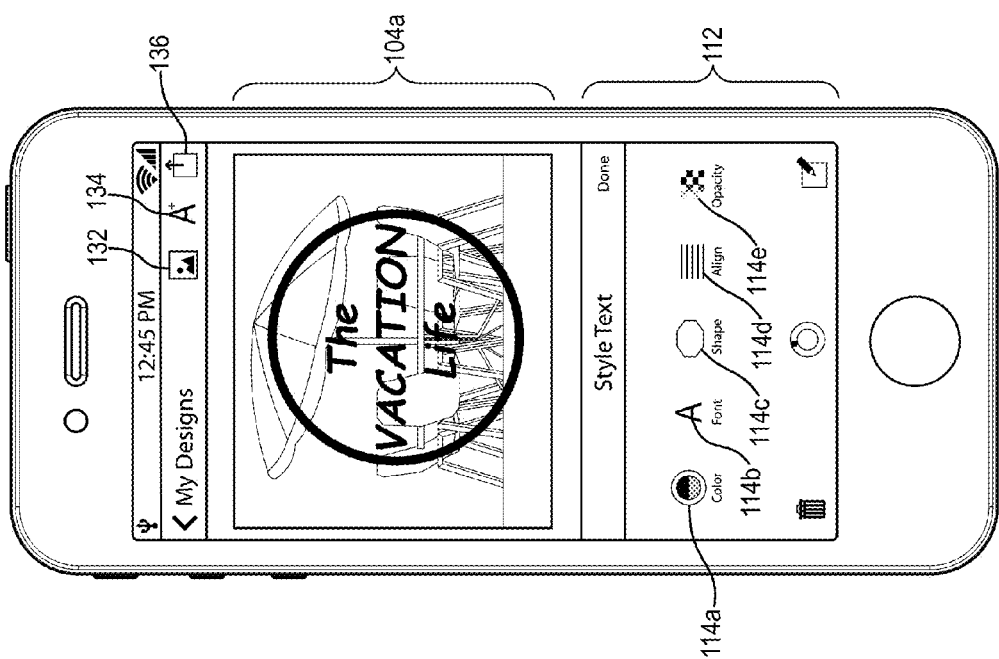
Fig. 2B
Fig. 2A

POSITIONING TEXT IN DIGITAL DESIGNS BASED ON AN UNDERLYING IMAGE

CROSS REFERENCE TO RELATED APPLICATIONS

This application claims the benefit of and priority to U.S. Provisional Application No. 62/198,537, filed Jul. 29, 2015, the entire contents of which are hereby incorporated by reference.

BACKGROUND

1. Technical Field

One or more embodiments of the present disclosure relate generally to digital media. More specifically, one or more embodiments of the present disclosure relate to creating or editing digital media.

2. Background and Relevant Art

Users generally spend many hours online every day. For example, a user may read social media posts and news articles online, purchase goods through retail websites online, compose emails and blog posts online, plan vacations online, perform work tasks online, and so forth. It is not surprising that, in light of how much time users spend online, providers of web content typically put great effort into creating web content that quickly draws a user's attention. For instance, an advertisement campaign that is professional and eye-catching generally causes an online user to become interested in the campaign.

Due to the immediate nature of the "Information Age," it has become crucial for Internet content providers to be able to provide digital media very quickly. Problems arise however when, during creation of digital media (e.g., a digital image), a designer changes various style elements within the digital media. For example, a designer may quickly change the underlying image of a digital design that is also associated with an overlay that includes the title of a news article. The new underlying image may not fit the style and placement of the overlay, prompting the designer to alter style elements in the overlay (e.g., the overlay placement, color, font, etc.). This trial-and-error process of changing various style elements when creating a final digital image that is aesthetically pleasing is generally time consuming and inefficient.

Additionally, a user in charge of creating digital media for use in connection with various types of Internet content may not have appropriate design training to create aesthetically pleasing digital media. For example, it is widely understood that eye-catching and visually pleasing digital media and graphics generally requires the use of specialized knowledge related to color usage, use of empty space, text alignment, etc. The average content provider typically does not have any specialized design training, and thus, has a difficult time manually creating digital media that looks professional and appropriate.

Furthermore, while various types of software exist that facilitate a user editing digital media, these software packages are generally bulky and require a substantial amount of processing power and memory from the computing device on which the software is running. Thus, in order to successfully edit digital images, a user generally utilizes a larger computing device, such as a laptop or desktop computer. Additionally, digital editing software run on a larger computer device typically allows the use of additional peripherals, such as a keyboard, a computer mouse, a stylus, etc. Accordingly, conventional systems provide users little recourse when faced with a need or desire to create or edit digital images "on-the-go" utilizing a handheld device (e.g., a smart phone, tablet, smart wearable) using only an associated touch screen.

Thus, there are several disadvantages to current methods for creating and editing digital media.

SUMMARY

One or more embodiments described herein provide benefits and/or solve one or more of the foregoing or other problems in the art with systems and methods that provide users with efficient and effective user experiences in creating and editing digital media. For example, one or more embodiments include systems and methods that automatically position or reposition an overlay or text in a digital design. Additionally, systems and methods described herein automatically determine optimal color and size for the overlay in the digital design. Thus, a user can quickly and easily create digital media without having to re-edit existing style elements within the digital design after every addition or change to the digital design.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which:

FIGS. 2A-2D illustrate another series of graphical user interfaces in connection with the digital content creation/editing system that allow for modification of digital designs in accordance with one or more embodiments;

DETAILED DESCRIPTION

Figure 1B:
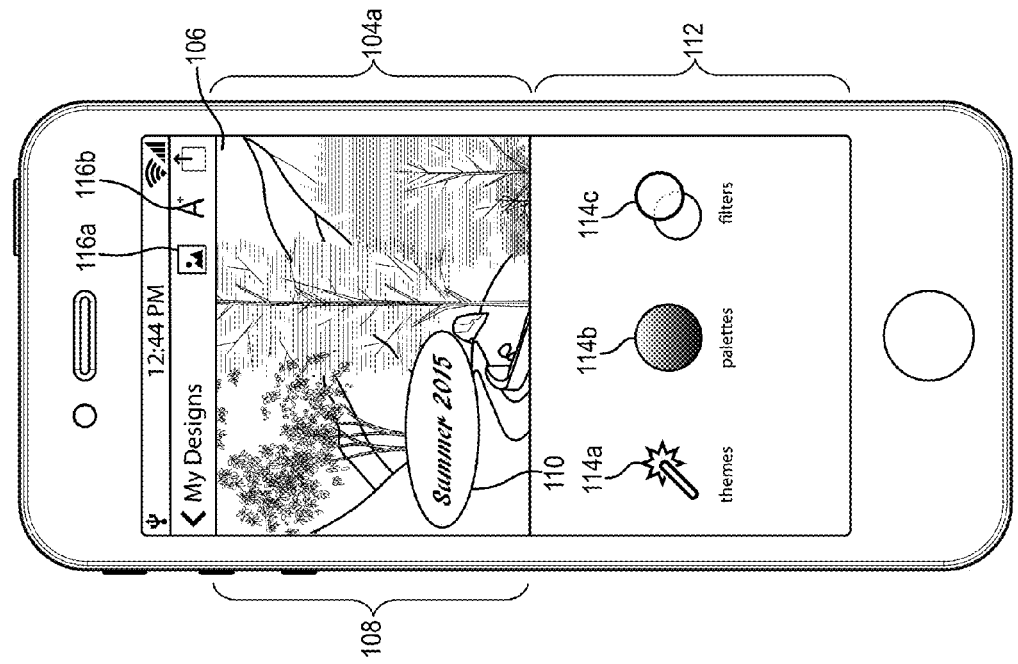
FIGS. 1A-1F illustrate a series of graphical user interfaces in connection with the digital content creation/editing system that illustrate placement of an overlay in a digital design.

One or more embodiments described herein include a digital creation/editing system that enables a user to easily create professional and aesthetically pleasing digital media. Specifically, the digital content creation/editing system automatically determines optimal placement, color, and size of an overlay in connection with an underlying image in a digital design. For example, the placement, color, and size of an overlay is generally coordinated with an underlying image such that the overlay remains readable and does not obscure key features of the underlying image. To illustrate, a digital design may include an overlay including the text, "Enjoy the Summer!" centered over an underlying image including a pool and some deck chairs. A user may decide to replace the underlying pool image with an image that includes the smiling face of a child. If the overlay remains unchanged, the text, "Enjoy the Summer!" will almost completely obscure the child's face, rendering the resulting digital design awkward looking and unprofessional.

Accordingly, in response to a user changing the underlying image associated with a digital design, the digital content creation/editing system as described herein alters the overlay associated with the digital design. In one or more embodiments, the digital content creation/editing system alters the overlay by changing the color and/or size of text, a backing shape, or border of the overlay. Additionally, the digital content creation/editing system changes the position, color, and size of the overlay relative to the underlying image in order to maximize readability of text within the overlay as well contrast between the overlay and the underlying image.

While the digital content creation/editing system is described herein as determining the optimal placement, color, and size of an overlay in a digital design in response to the replacement of the underlying image in the digital design, one of skill will understand that the digital content creation/editing system determines optimal placement, color, and size of an overlay in response to other events as well. For example, the digital content creation/editing system determines the optimal placement, color, and size of an overlay in response to a change to the underlying image other than a replacement (e.g., a repositioning of the underlying image, a zoom in/out on the underlying image, a color palette change to the underlying image, etc.). Additionally, the digital content creation/editing system determines the optimal placement, color, and size of an overlay in response to any other type of change that affect the digital design (e.g., initially placing a first or subsequent overlay on the underlying image, adding additional text to an overlay, etc.).

In at least one embodiment, the digital content creation/editing system determines a new placement for an overlay by first identifying all potential placements within the digital design. For example, the digital content creation/editing system identifies potential placements within the digital design by dividing the digital design into a grid, identifying empty space versus crowded space within the digital design, etc. In some cases, each potential placement may be the same size, while in other cases, potential placements may be of differing sizes.

Once the digital content creation/editing system has identified one or more potential placements within the digital design, the digital content creation/editing system determines which potential placement is most optimal by calculating a placement score for each potential placement within the digital design. For example, the digital content creation/editing system calculates a placement score for a potential placement within the digital design based on facial recognition, edge detection, symmetry detection, alignment detection, etc. Thus, the placement score for a particular potential placement indicates how well the resulting digital image will look if the overlay is placed at that particular potential placement.

In response to identifying a potential placement within the digital design with the highest placement score, the digital content creation/editing system can further modify the overlay in order to ensure readability and contrast. For example, the digital content creation/editing system determines whether the color and size of the overlay is optimal in relation to the new placement of the overlay. To illustrate, if the new placement of the overlay is over a lightly colored portion of the underlying image, the digital content creation/editing system may change the text color of the overlay so as to provide better contrast and readability.

As used herein, a "digital design" refers to any type of digital media or multimedia image. For example, a digital design includes, but is not limited to, digital photographs, digital video, computer generated imagery, "GIFs," "JPEGs," "PDFs," etc. In one or more embodiments, a digital design is any type of computer readable media that is capable of being digitally edited. Generally, a digital design includes an underlying image and an overlay.

As used herein, an "underlying image" refers to an image that serves as the background of a digital design. For example, an underlying image associated with a digital design includes any variation of shapes, colors, people, landmarks, interiors, exteriors, and so forth. The underlying image associated with a digital design is generally taken from an input file (e.g., a JPEG file, GIF file, a PNG file, a PDF file, a raw digital photograph file, etc.). Other examples of an underlying image are animations, illustrations, or other digital content. Still another example of an underlying image is a frame of a video.

As used herein, an "overlay" refers to an image or design element that serves as the foreground of a digital design. For example, one type of overlay is a textual overlay. A textual overlay includes text, and in some cases, a backing shape or border. An overlay can have variable opacity such that, when in combination with an underlying image, part of the underlying image is viewable through the overlay. Together, the underlying image and the overlay serve to create a rich digital design wherein the content of the overlay is highlighted by the content of the underlying image.

As used herein, a "placement" or "potential placement" refer to a position relative to the underlying image, over which an overlay can be placed. For example, because the underlying image and the overlay are separate elements of a digital image, the overlay can be positioned over the underlying image in a variety of ways. In one or more embodiments, the overlay is only some fraction of the size of the underlying image, so the entire overlay is still viewable even when not centered over the underlying image. Accordingly, there are generally multiple placements associated with the position of an overlay relative to an underlying image.

In one or more embodiments, the digital content creation/editing system presents series of graphical user interfaces ("GUIs" or "user interfaces") that enable a user to edit and/or create digital images. The digital content creation/editing system provides the user interfaces on the display of a handheld device. As used herein, the term "handheld device" refers to a device sized and configured to be held in a single hand of a user (e.g., a mobile phone or smart phone, a personal digital assistant, a tablet computer, a smart wearable). Alternatively, however, the digital content creation/editing system can present graphical user interfaces on any other suitable computing device such as, but not limited to, a larger wireless device, a laptop or desktop computer, and/or any other suitable computing device.

The process by which the digital content creation/editing system automatically determines the placement, color, and size of an overlay relative to an underlying image in a digital design will now be described with reference to a series of user interface in FIGS. 1A-1F. It will be understood that the digital content creation/editing system displays the user interfaces illustrated in FIGS. 1A-1F on the touch screen of a client-computing device such as a smart phone, tablet, smart wearable, etc. Furthermore, FIGS. 1A-1F and the related description reference creation and modification of digital designs comprising an underlying image and an overlay. One will appreciate that in alternative embodiments, the digital designs can comprise videos, animations, illustrations, or other digital content in addition to, or in place of, a digital image. Thus, the reference to a digital image below is to aid in explaining the various embodiments and should not be considered limiting.

Figure 1A:
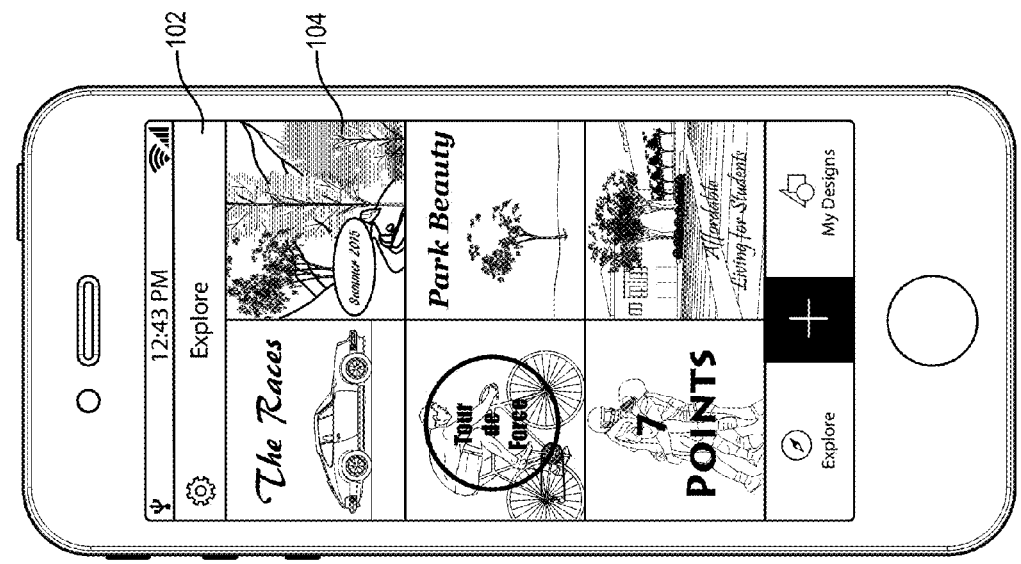

For example, as shown in FIG. 1A, a user begins the process of creating a digital design by selecting a digital design 104 from the image gallery GUI 102. In one or more embodiments, the image gallery GUI 102 includes a variety of existing design or images (e.g., provided by the digital content creation/editing system, provided by a community of users of the digital content creation/editing system, or previous designs/images stored by the user) that the user can select for editing in order to create a new digital design. Each of the existing designs generally includes a combination of images and text, as well as other style elements (e.g., backing shapes, overlays, etc.). As will be further described below, in alternative or additional embodiments, rather than selecting an existing design to edit, the user can create a new design that is not based on any existing image or previous design.

In response to selecting the digital design 104 from the image gallery GUI 102, as shown in FIG. 1A, the digital content creation/editing system provides an editable digital design 104a in an editing GUI 106, as shown in FIG. 1B. Because the existing images shown in the image gallery GUI 102 are available to all users of the digital content creation/editing system, in at least one embodiment, the digital content creation/editing system treats a selected existing image as a template. Thus, the digital content creation/editing system creates a digital design that is a copy of the selected existing design so that a user can edit the copy of the existing design rather than editing the original existing design.

For example, as shown in FIG. 1B, the digital content creation/editing system provides the editable digital design 104a within the editing GUI 106. As discussed above, the editable digital design 104a includes an underlying image 108 (e.g., a hiking trail surrounded by trees) that serves as a background for an overlay 110 (e.g., "Summer 2015" within an oval backing shape). The backing shape of the overlay 110 is completely opaque and as such blocks out the portions of the underlying image 108 behind the overlay 110. In alternative embodiments, the overlay 110 may be more transparent so as to allow portion of the underlying image 108 behind the overlay 110 to be viewed.

As further shown in FIG. 1B, the editing GUI 106 also includes an editing control palette 112 with one or more editing controls 114a-114c that enable the user to edit various elements associated with the editable digital design 104a. For example, in response to the user selecting the editing control 114a, the digital content creation/editing system provides the user with automatically generated themes that can be applied to the editable digital design 104a. In response to the user selecting the editing control 114b, the digital content creation/editing system provides the user with various color palettes that can be applied to the editable digital design 104a. In response to the user selecting the editing control 114c, the digital content creation/editing system provides the user with various filters that can be applied to the editable digital design 104a.

While the editing control palette includes controls that allow the user to edit both the overlay 110 and the underlying image 108 together, the editing GUI 106 further includes controls that enable the user to edit the overlay 110 and the underlying image 108 separately. For example, the digital design control 116a enables the user to edit or replace the underlying image 108. Similarly, the digital design control 116b enables the user to edit or replace the overlay 110.

Figure 1D:
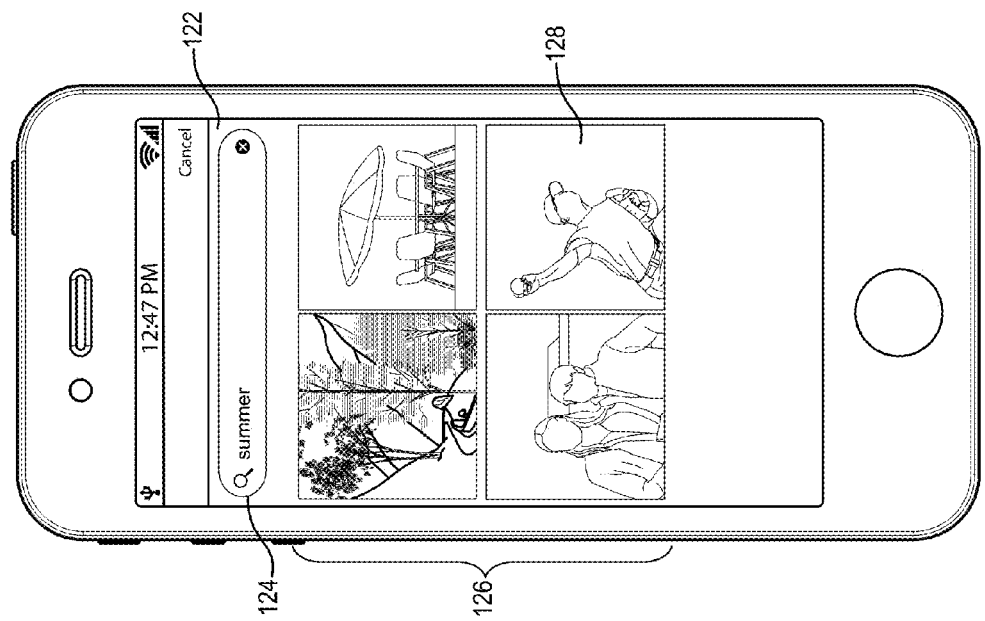
Figure 1C:
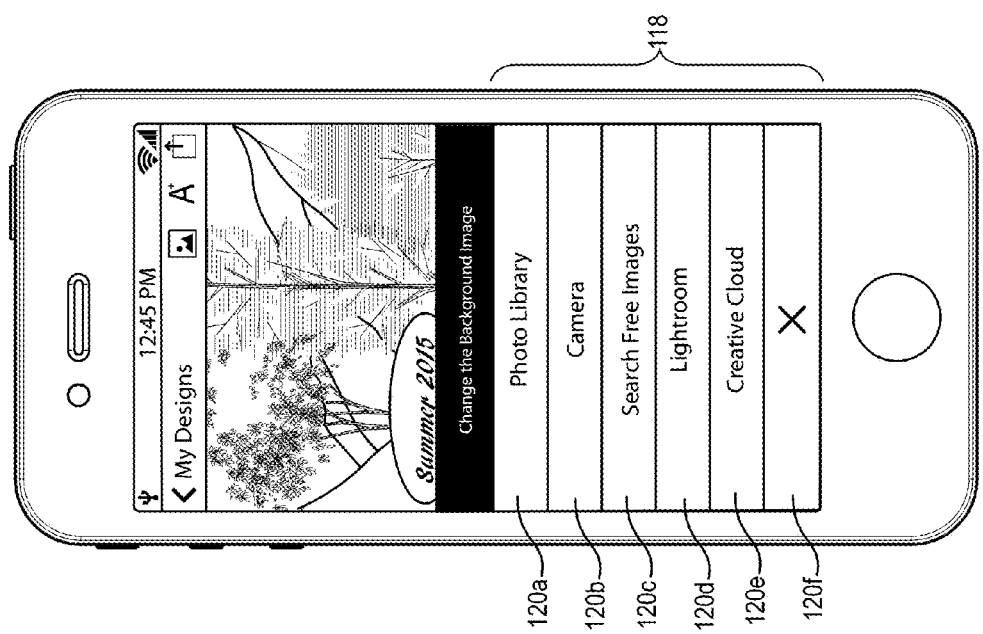

In response to the user selecting the digital design control 116a, as shown in FIG. 1B, the digital content creation/editing system provides the image selection palette 118, as shown in FIG. 1C. The image selection palette 118 includes image selection controls 120a-120e that enable a user to select a replacement for the underlying image 108 from one of a variety of sources. For example, in response to the user selecting the image selection control 120a, the digital content creation/editing system enables the user to select a replacement for the underlying image 108 from the user's own photo library (e.g., stored locally on the user's handheld computing device).

In response to the user selecting the image selection control 120b, the digital content creation/editing system enables the user to capture a replacement for the underlying image 108 via a camera associated with the user's handheld computing device. In response to the user selecting the image selection control 120c, the digital content creation/editing system enables the user to select a replacement for the underlying image 108 from various images maintained by the digital content creation/editing system and/or publically available via the Internet or another network. In response to the user selecting the image selection control 120d, the digital content creation/editing system enables the user to select a replacement for the underlying image 108 from another photo editing system (e.g., ADOBE® PHOTOSHOP® LIGHTROOM®). In response to the user selecting the image selection control 120e, the digital content creation/editing system enables the user to select a replacement for the underlying image 108 from a cloud-based storage service (e.g., ADOBE® CREATIVE CLOUD®). In response to the user selecting the image selection control 120f, the digital content creation/editing system removes the image selection palette 118, and returns to the editing GUI 106.

In response to the user selecting the image selection control 120c, as shown in FIG. 1C, the digital content creation/editing system provides the free image selection library 122, as shown in FIG. 1D. In one or more embodiments, the free image selection library 122 includes a search bar 124 and a free image gallery 126. In at least one embodiment, the digital content creation/editing system auto-populates the search bar 124 with a search term that is based on the overlay 110 within the editable digital design 104a. For example, the digital content creation/editing system performs text analysis on the overlay 110 in order to identify one or more keywords, themes, topics, etc. The digital content creation/editing system then auto-populates the search bar 124 and auto-searches for images based on the identified keywords, themes, topics, and so forth.

Accordingly, in response to the user selecting the image selection control 120c, as shown in FIG. 1C, the digital content creation/editing system presents the free image selection library already populated with search results from the search term "summer," as shown in FIG. 1D. In other embodiments, in response to the user selecting the image selection control 120a, the digital content creation/editing system can automatically determine that the overlay 110 includes a reference to a date or year. Thus, the digital content creation/editing system can then auto-search through the user's photo library for photographs that were taken by the user during the year 2015, or more specifically during June through August of 2015. In response to the user selecting either the image selection controls 120d or 120e, the digital content creation/editing system can similarly auto-search based on the content of the overlay 110.

As shown in FIG. 1D, the free image gallery 126 includes the results of the digital content creation/editing system's auto-search of free images based on the search term "summer." In one or more embodiments, the digital content creation/editing system identifies search results based on a similarity between the search term and metadata associated with each of the search results. Additionally, the digital content creation/editing system can utilize various object recognition algorithms in identifying search results that identify objects within each image that are typically associated with the search term.

Figure 1F:
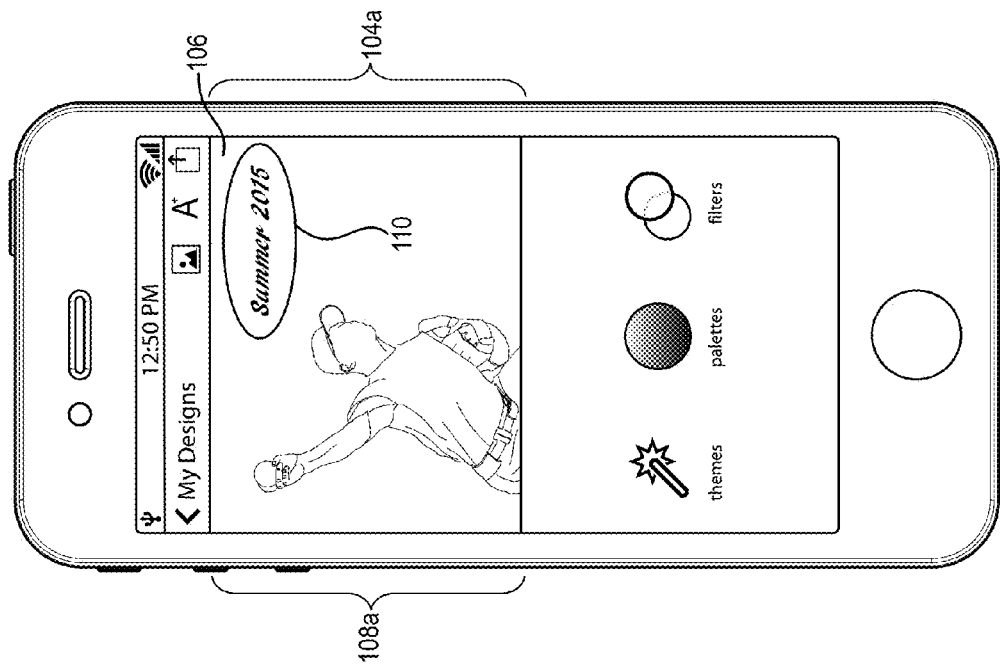
Figure 1E:
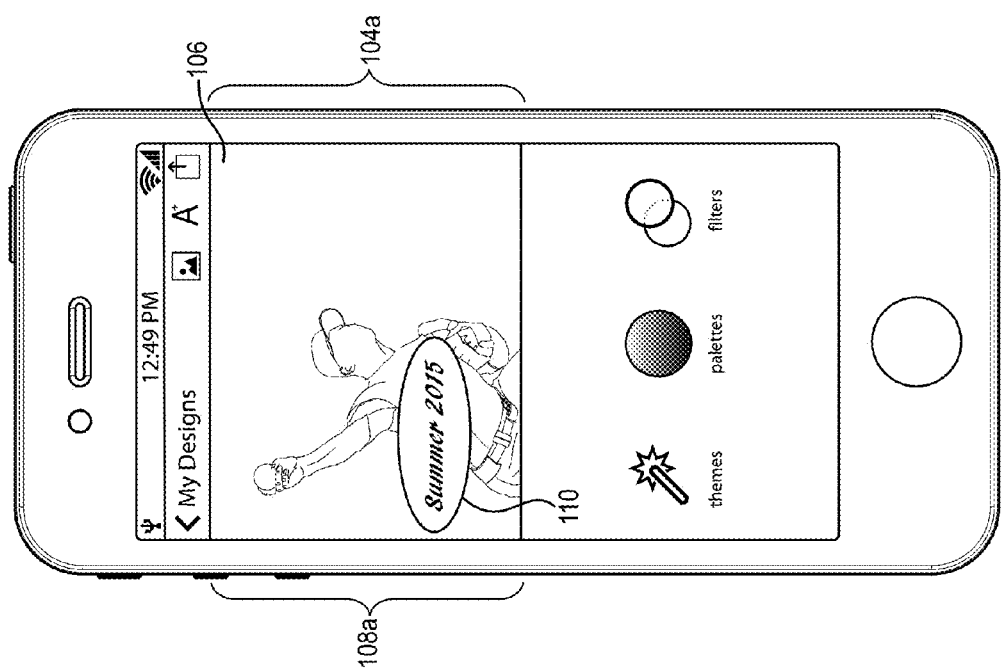

In response to the user selecting the image 128 from the free image gallery 126, as shown in FIG. 1D, the digital content creation/editing system replaces the underlying image 108 in the editable digital design 104a with the selected image 128, as shown in the editing GUI 106 of FIG. 1E. Accordingly, the selected image 128 becomes the replacement underlying image relative to the editable digital design 104a in FIG. 1E. In one or more embodiments, instead of a "replacement underlying image" the system can identify a "changed underlying image." As described above, the simple replacement of one underlying image for another is often problematic. For example, the placement of the overlay 110 over the underlying image 108, as shown in FIG. 1B, was aesthetically pleasing due to the symmetry and alignment of the overlay 110 relative to the underlying image 108.

As mentioned above, the digital content creation/editing system detects changes to the digital design in multiple ways. For example, the digital content creation/editing system detects changes to an underlying image of a digital design by detecting a change to the color palette of the underlying image, a change to the size of the underlying image, a change to the format of the underlying image, or a change to the source file of the underlying image. Accordingly, the detected change to the digital design (e.g., via the underlying image or the overlay) triggers further analysis by the digital content creation/editing system such that the digital content creation/editing system can determine optimal placement, color, and size of the overlay.

When the digital content creation/editing system replaced the underlying image 108 with the replacement underlying image 108a, as shown in FIG. 1E, the digital design 104a lost its aesthetic appeal. For example, the placement of the overlay 110 relative to the replacement underlying image 108a now covers the majority of the main object within the replacement underlying image 108a (e.g., the baseball player). Additionally, the positioning of the overlay 110 relative to the replacement underlying image 108a creates blank space within the digital design 104a. As such, the digital design 104a illustrated in FIG. 1E is no longer symmetrical or aligned.

In additional or alternative examples, the placement of the overlay 110 over the replacement underlying image 108a can affect the readability of any text within the overlay 110. For example, if an overlay includes dark colored text and no backing shape and the replacement underlying image includes mostly dark objects and backgrounds, the overlay in the resulting digital design would be virtually unreadable. Furthermore, if an overlay includes a backing shape of a particular color, the backing shape may lose definition and contrast when positioned over a replacement underlying image 108a.

Accordingly, in order to address the issues that are caused by replacing the underlying image 108 with the replacement underlying image 108a, the digital content creation/editing system can automatically identify an optimal placement for the overlay 110 relative to the replacement underlying image 108a. For example, as shown in FIG. 1F, the digital content creation/editing system can identify various potential placements for the overlay 110, and determine that the optimal potential placement for the overlay 110 relative to the replacement underlying image 108a is in the top corner of the digital design 104a. As shown in FIG. 1F, the new placement of the overlay 110 no longer covers the main object shown in the replacement underlying image 108a (e.g., the baseball player), and restore symmetry, alignment, etc. to the digital design 104a.

In one or more embodiments, the digital content creation/editing system does not present the digital design 104a with the overlay 110 in its original placement, as shown in FIG. 1E. Rather, upon selection of the replacement underlying image 108a, the digital content creation/editing system automatically determines that the original placement of the overlay 110 is not optimal and places the overlay 110 at an optimal placement relative to the replacement underlying image 108a. In additional embodiments, the digital content creation/editing system can provide controls in the editing GUI 106 that allow the user to revert to an earlier placement of the overlay 110 relative to the replacement underlying image 108a. Further more, the digital content creation/editing system can provide controls in the editing GUI 106 that allow the user to cycle through additional optimal placements of the overlay 110.

In order to determine the optimal placement, size, color, etc. for an overlay relative to a replacement underlying image in a digital design, the digital content creation/editing system utilizes an optimization-based approach. For example, the digital content creation/editing system begins by utilizing a scoring function to evaluate potential placements (e.g., an area within which the digital content creation/editing system can place the overlay) at regular intervals over the digital design. In one embodiment, the regular intervals over the digital design are a grid pattern, wherein each potential placement is the same size. In other embodiments, the intervals are not regular but are based on quadrants within the digital design, blank space within the digital design, objects within the digital design, etc. and are not equally sized. In at least one embodiment, each potential placement within the digital design is the same size as the overlay.

To score each potential placement within the digital design, the digital content creation/editing system calculates a scalar value for each of a variety of features associated with the potential placement, then adds the resulting scalar values together in order to determine a total placement score for the potential placement. As used herein, a "scalar value" is a number that can be increased linearly or exponentially depending on the feature with which the scalar value is associated. For example, the digital content creation/editing system may place particular importance on facial recognition. Accordingly, a potential placement that does not cover any portion of a face may be associated with a scalar value that is exponentially higher than the scalar value associated with another potential placement that does cover a portion of a face. In some cases, the digital content creation/editing system weights the total placement score based on one or more of the scalar values. In at least one embodiment, the digital content creation/editing system determines that the potential placement with the highest total placement score is the optimal placement for the overlay relative to the replacement underlying image.

As mentioned above, the digital content creation/editing system calculates a scalar value for each of a variety of features associated with a potential placement. In one or more embodiments, the variety of features associated with a potential placement within the digital design include, but are not limited to, one or more edges within the potential placement relative to the replacement underlying image, one or more faces detected within the potential placement relative to the replacement underlying image, the symmetry of the potential placement relative to the replacement underlying image, the size of the potential placement relative to the replacement underlying image, the alignment of the potential placement relative to the replacement underlying image, and any overlap of the potential placement with one or more objects within the replacement underlying image. Each of these features will now be discussed in more detail.

To calculate a scalar value for one or more edges (i.e., an edge scalar value) within the potential placement relative to the replacement underlying image, the digital content creation/editing system performs edge detection on the replacement underlying image to determine where the strong visual edges are located in the replacement underlying image. The digital content creation/editing system then assigns a higher scalar value to the potential placement if the potential placement does not overlap with any of the strong visual edges within the replacement underlying image. Similarly, the digital content creation/editing system assigns a lower scalar value to the potential placement if the potential placement overlaps with any of the strong visual edges within the replacement underlying image. In at least one embodiment, if the overlay includes text, the digital content creation/editing system assigns a significantly lower scalar value to the potential placement if the potential placement overlaps with any of the strong visual edges within the replacement underlying image that would make the text in the overlay harder to read (e.g., if the overlay did not include a backing shape, and the strong visual edge therefore intersects the text making it unreadable).

As mentioned above, the digital content creation/editing system calculates a scalar value for a potential placement based on one or more faces (i.e., a face scalar value) within the potential placement relative to the replacement underlying image. The digital content creation/editing system generally prioritizes faces (e.g., human faces, pet faces, etc.) in an image and assumes that a detected face in a replacement underlying image should not be covered by an overlay. Accordingly, the digital content creation/editing system performs facial detection on the replacement underlying image to detect the presence of any faces. In one or more embodiments, if a potential placement covers a portion of a detected face, the digital content creation/editing system assigns a lower scalar value to the potential placement. In at least one embodiment, the digital content creation/editing system assigns a scalar value to the potential placement that is inversely proportional to the amount of the detected face that is covered by the potential placement. Thus, if the potential placement covers a large amount of a detected face, the resulting scalar value is very low.

Also as mentioned above, the digital content creation/editing system calculates a scalar value for a potential placement based on how the potential placement affects the symmetry of the digital design (i.e., a symmetry scalar value). In one or more embodiments, the digital content creation/editing system places more value on digital designs that are symmetrical about one or more of the x-axis and the y-axis, with regard to the placement of the overlay over the underlying image. For example, the digital content creation/editing system assigns a higher scalar value to a potential placement that results in a symmetrical layout between the overlay and the replacement underlying image. Conversely, if a particular potential placement results in a non-symmetrical layout between the overlay and the replacement underlying image, the digital content creation/editing system assigns a lower scalar value to the particular potential placement.

In one or more embodiments, the digital content creation/editing system prioritizes overlays that are larger and/or include text in a larger font size. In other words, the digital content creation/editing system prioritizes readability of any text in an overlay, and assigns larger scalar values to potential placements that allow for better readability in an overlay by being larger in size. For example, as described above, in some cases, the digital content creation/editing system divides potential placements in a grid over an underlying image. In that case, the digital content creation/editing system assigns each potential placement the same size-based scalar value because each potential placement is the same size. In other cases, the digital content creation/editing system divides potential placements based on other criteria such that the potential placements are not the same size. Thus, in that case, the digital content creation/editing system assigns larger sized potential placements that allowed for larger text in the overlay with higher scalar values.

As mentioned above, the digital content creation/editing system also assigns a scalar value to a potential placement based on how the potential placement affects the alignment of the resulting digital design (i.e., an alignment scalar value). In order to calculate an alignment scalar value, the digital content creation/editing system determines how well the potential placement aligns with other objects in the digital design. For example, the digital design may include an underlying image with strong horizontal lines (e.g., a picture of a cityscape with skyscapers). In that case, the digital content creation/editing system assigns a lower scalar value to a potential placement that is diagonally positioned over the underlying image because the potential placement would not look aesthetically pleasing against the strong horizontal lines of the underlying image. Conversely, the digital content creation/editing system would assign a higher scalar value to a potential placement that is horizontally positioned over the underlying image. Along similar lines, the digital content creation/editing system may assign a slightly higher scalar value to a potential placement that is vertically positioned over the underlying image, as a vertically positioned potential placement would be perpendicular to the strong horizontal lines in the underlying image and thus still aesthetically pleasing.

In one or more embodiments, the digital creation/editing system also assigns a scalar value to a potential placement based on whether the potential placement overlaps with one or more existing overlays and/or objects within an underlying image (i.e., an overlap scalar value). In order to maximize readability and design in a resulting digital design, the digital creation/editing system avoids allowing elements in the digital design to overlap. Accordingly, the digital creation/editing system assigns a lower scalar value to a potential placement that overlaps with existing overlays and/or objects within an underlying image of the digital design. Conversely, the digital creation/editing system assigns a higher scalar value to a potential placement that does not overlap with existing overlays and/or objects within the underlying image. Furthermore, in at least one embodiment, the digital creation/editing system assigns an even higher scalar value to a potential placement that is evenly spaced with existing overlays and/or objects within the underlying image.

Once the digital content creation/editing system has assigned scalar values to a potential placement based on edge detection, facial recognition, symmetry detection, size, alignment and overlap of the potential placement, the digital content creation/editing system adds extra weight to certain scalar values. For example, in at least one embodiment, the digital content creation/editing system values facial detection more than any other attribute associated with a potential placement. Accordingly, the digital content creation/editing system adds extra weight to the facial detection scalar value assigned to the potential placement. Thus, if the potential placement has a low facial detection scalar value because the potential placement would place an overlay over a face in the underlying image, the added weight would further penalize that potential placement. Similarly, if the potential placement has a high facial detection scalar value because the potential placement would not place an overlay over a face in the underlying image, the added weight would further bolster the resulting placement score of the potential placement.

It at least one embodiment, the digital content creation/editing system further weights one or more scalar values based on an identified sentiment associated with the digital design. For example, in one or more embodiments, the digital content creation/editing system performs textual analysis on any text in the overlay and on any metadata associated with the underlying image in order to identify a sentiment associated with the digital design. If the sentiment associated with the digital design indicates the digital design is associated with a positive emotion, the digital content creation/editing system can weight certain scalar values more heavily, and vice versa.

Once the digital content creation/editing system has calculated weighted scalar values for all attributes associated with a potential placement (e.g., scalar values for edge detection, facial recognition, symmetry detection, size, alignment and overlap of the potential placement), the digital content creation/editing system can determine an overall placement score for each potential placement. The digital content creation/editing system determines an overall placement score for the potential placement by adding together all of the calculated weighted scalar values for the potential placement. Alternatively, the digital content creation/editing system determines an overall placement score for the potential placement by averaging together all of the calculated weighted scalar values for the potential placement. The digital content creation/editing system continues this process for all potential placements within the digital design until the digital content creation/editing system has calculated an overall placement score for each potential placement within the digital design.

Although the description above illustrates the process for identifying the best potential placement for a single overlay associated with a digital design, it is understood that a digital design can include multiple overlays. For example, a digital design can be associated with a first overlay that includes a title, and a second overlay that includes a sub-title. Accordingly, the first overlay can include text with a larger text size, while the second overlay includes text with a smaller text size. In that case, the digital content creation/editing system can include the various attributes of the first overlay in the determination of the best potential placement of the second overlay, or vice versa depending on the order in which the first and second overlays are added to the digital design.

Once the digital content creation/editing system calculates weighted placement scores for each potential placement for a single overlay relative to an underlying image associated with the a digital design, the digital content creation/editing system identifies the best potential placement. In at least one embodiment, the digital content creation/editing system identifies the best potential placement by identifying the potential placement with the highest weighted placement score. Alternatively, the digital content creation/editing system can determine that the best potential placement is the potential placement that placement scores well relative to a subset of attributes (e.g., facial detection, symmetry, etc.).

After an optimal placement for the overlay has been identified, the digital content creation/editing system determines whether one or more colors associated with the overlay should be changed. For example, an overlay may include a backing shape or border of a given color, and/or text of a given color. When placed over a particular area of the underlying image, the colors within the particular area of the underlying image may cause to the backing shape or border to become hard to see. Similarly, the colors within the particular area of the underlying image may cause the text of the overlay to become unreadable.

Accordingly, the digital content creation/editing system performs a comparison of the colors within the overlay to the colors within the underlying image in the area where the digital content creation/editing system has determined is the optimal placement for the overlay. In one or more embodiments, the digital content creation/editing system changes one or more colors in the overlay in response to determining that the combination of colors between the overlay and the placement within the underlying image would lead to poor readability and/or a poor visual aesthetic. The digital content creation/editing system utilizes rules, guidelines, and various design principles in determining how to change one or more colors in the overlay to maximize readability and visual aesthetic.

Furthermore, after determining the optimal placement and colors for an overlay, in one or more embodiments the digital content creation/editing system also changes the size of the overlay. For example, as mentioned above, the digital content creation/editing system prioritizes readability and visual aesthetic when determining the optimal placement of an overlay relative to a digital design. In at least one embodiment, the digital content creation/editing system determines whether the size of an overlay can be changed (e.g., to enhance readability) without altering the resulting visual aesthetic of the digital design when the overlay is in its optimal placement. Additionally, the digital content creation/editing system determines whether the size of an overlay can be changed to enhance the visual aesthetic of the digital design. Based on the digital content creation/editing system's determination, the digital content creation/editing system minimizes or enlarges the overlay after the overlay is in its optimal placement.

In additional or alternative embodiments, rather than automatically placing and otherwise altering a textual overlay, the digital content creation/editing system enables additional controls that allow the user to manually edit the digital design 104a. For example, the digital content creation/editing system provides the manual control palette 112, as shown in FIG. 2A. In one or more embodiments, the manual control palette 112 includes a color control 114a, a font control 114b, a backing control 114c, an alignment control 114d, and an opacity control 114d.

In response to selecting the color control 114d, as shown in FIG. 2A, the user can manually edit color within the digital design 104a. In one or more embodiments, in response to the user selecting the color selection control 124, the digital content creation/editing system can provide the color palette 116, as shown in FIG. 2B. For example, the color palette 116 includes various color options that the digital content creation/editing system applies to the digital design 104a (e.g., the digital content creation/editing system may present all available colors within the color palette 116, or may only present colors that will likely be aesthetically pleasing within the digital design 104a). In some embodiments, the digital content creation/editing system applies a selected color 118 to only the text within the digital design 104a. In other embodiments, the digital content creation/editing system applies the selected color 118 to a portion of the digital design 104a indicated by the user. In at least one embodiment, in response to the user tapping the selected color 118, the digital content creation/editing system provides previews of the selected color 118 in association with the digital design 104a. If the user wants to return to the manual control palette 112 without saving any changes to the digital design 104a, as shown in FIG. 2A, the use can select the exit control 120. If the user wants to save a change to the digital design 104a, the user can select the save control 122.

In order to manually edit the fonts shown in the digital design 104a, the user can select the font control 114a, as shown in FIG. 2A. For example, in response to the user selecting the font control 114a, as shown in FIG. 2A, the digital content creation/editing system provides the font palette 124, as shown in FIG. 2C. In one or more embodiments, the font palette 124 includes various fonts available for application to the digital design 104a. In response to the user tapping the selected font 126, the digital content creation/editing system applies the selected font 126 to the digital design 104a.

Figure 2D:
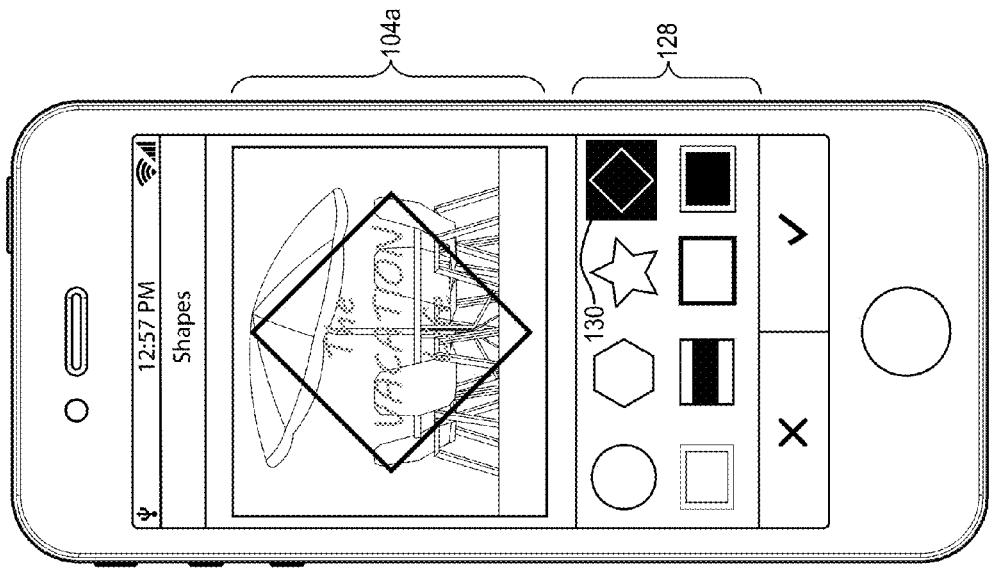
Figure 2C:
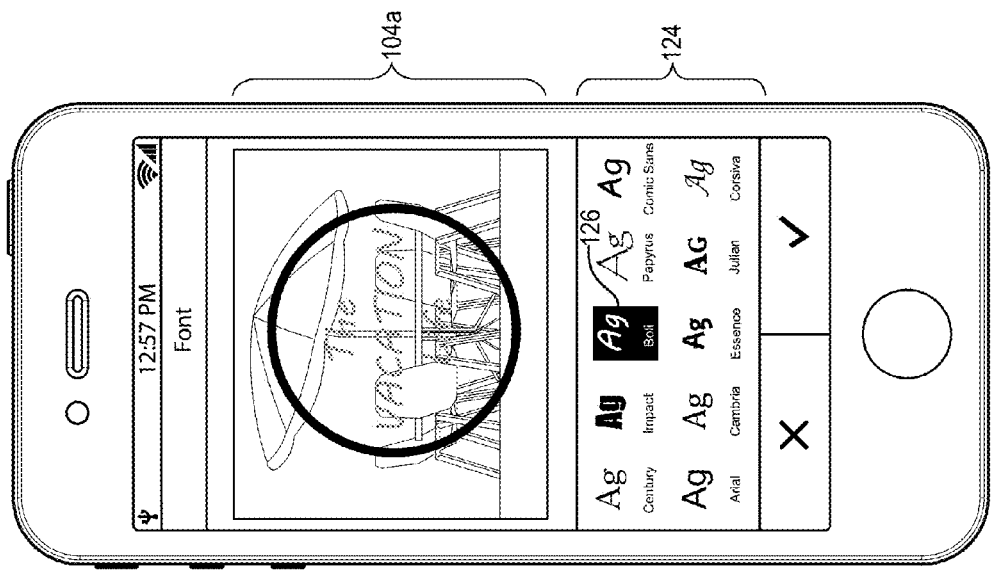

In order to manually change the backing shape shown in the digital design 104a, the user can select the backing control 114c, as shown in FIG. 2A. In response to the user selecting the backing control 114c, as shown in FIG. 2A, the digital content creation/editing system can provide the backing shape palette 128, as shown in FIG. 2D. In one or more embodiments, the backing shape palette 128 includes a variety of backing shape elements that the user can select. In response to the user selecting the backing shape 130, the digital content creation/editing system can apply the shape illustrated by the backing shape 130 to the digital design 104a. In one or more embodiments, the digital content creation/editing system can automatically alter various features or characteristics of the displayed text within the digital design 104a in order for the displayed text to function cohesively with the selected backing shape. For example, in order to apply the shape illustrated by the backing shape element 116 to the digital design 104a, the digital content creation/editing system can alter the size, font, color, placement, and opacity of the text within the digital design 104, such that the text is viewable against the selected backing shape.

Furthermore, the user can manually alter the alignment of the text within the digital design 104a. In one or more embodiments, in response to the user selecting the alignment control 114d, as shown in FIG. 2A, the digital content creation/editing system can alter the alignment of the text displayed in the digital design 104a. For example, the digital content creation/editing system can cause the alignment of the text to become center-aligned, right-justified, left-justified, etc. In at least one embodiment, the digital content creation/editing system can cycle through different text alignments in response to the user repeatedly selecting the alignment control 114d.

Additionally, the user can manually alter the opacity of the text, or other selected elements, within the digital design 104a. In one or more embodiments, in response to the user selecting the opacity control 114e, as shown in FIG. 2A, the digital content creation/editing system changes the opacity of one or more elements within the digital design 104a. For example, the digital content creation/editing system can change the opacity of the text within the digital design 104a to become more or less opaque. In at least one embodiment, the digital content creation/editing system cycles through various levels of opacity in response to the user repeatedly selecting the opacity control 114e. Alternatively, the digital content creation/editing system provides a slider control in order for the user to select an opacity level in relation to the digital design 104a.

The user can further manually edit various aspects of the background portion or the textual portion of the digital design 104a by selecting the picture editing control 132 or the text editing control 134, as shown in FIG. 2A. Once the user is satisfied with the look and feel of the digital design 104a, the user can share and/or store the digital design 104a. In one or more embodiments, in response to the user selecting the sharing control 136, as shown in FIG. 2A, the digital content creation/editing system provides various sharing options. By utilizing the various controls provided, the user can upload the digital design 104a to various social media channels, save the digital design 104a locally or remotely, print the digital design 104a, etc. In at least one embodiment, the digital content creation/editing system automatically saves the digital design 104a at regular intervals in order to save the user from accidentally loosing edits.

Figure 3:
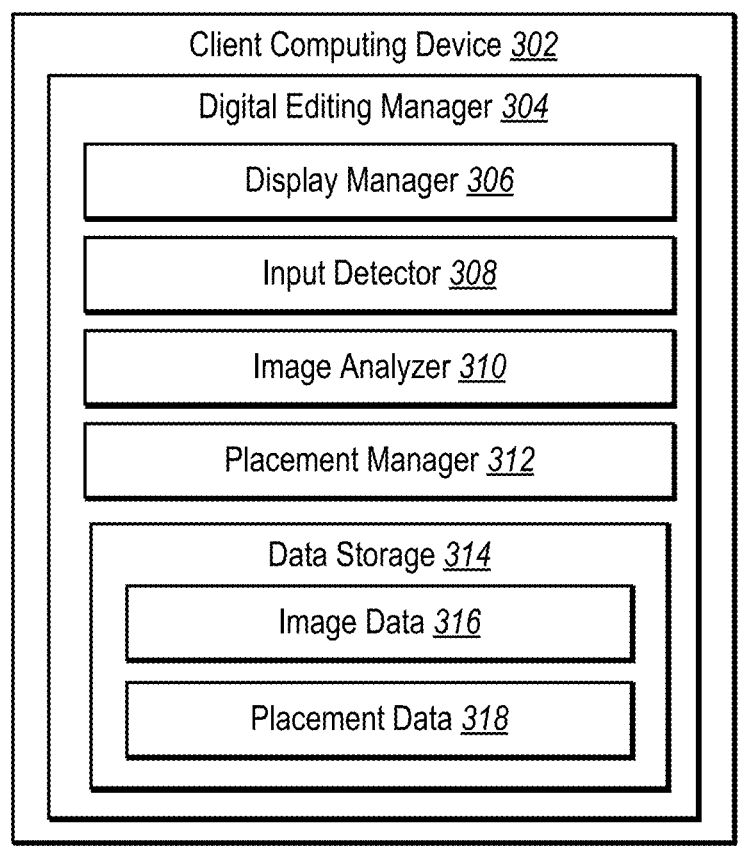
FIG. 3 illustrates a schematic diagram of the digital content creation/editing system in accordance with one or more embodiments.

FIGS. 1A-2D and their related descriptions detail the functions and features of the digital content creation/editing system with regard to a series of user interfaces with which a user can interact. FIG. 3 illustrates an example architecture for the digital content creation/editing system. For example, as shown in FIG. 3, the digital content creation/editing system includes a digital editing manager 304 installed on a client-computing device 302. In one or more embodiments, the digital editing manager 304 is a native application installed on the client-computing device 302. For instance, the digital editing manager 304 may be a mobile application that installs and runs on a client device with a touch screen, such as a smart phone or a tablet. Alternatively, the digital content creation/editing system can run on a non-touch screen enabled device.

Thus, the client-computing device 302 can be any type of computing device (e.g., a desktop or laptop), but is preferably a handheld device such as a smart phone, a tablet, a personal digital assistant, a smart wearable (e.g., a smart watch or enhanced eyewear), etc. In additional or alternative embodiments, the digital editing manager 304 is a desktop application, widget, or other form of a native computer program. Alternatively, the digital editing manager 304 may be a remote application accessed by the client-computing device 302 over a network, or may be a web application that is executed with a web browser of the client-computing device 302.

As shown in FIG. 3, the digital editing manager 304 includes, but is not limited to, a display manager 306, an input detector 308, an image analyzer 310, a styling combination generator 312, and a data storage 314. In one or more embodiments, the components 304-314 comprise software, hardware, or both. For example, the components 304-314 can comprise computing instructions stored on a non-transitory computer-readable storage medium and executable by at least one processor of the client-computing device 302. When executed by the at least one processor, the computing-executable instructions cause the client-computing device 302 to perform the methods and processes described herein. Alternatively, the components 304-314 can comprise hardware, such as a special purpose processing device to perform a certain function or group of functions. Additionally or alternatively, the components 304-314 can comprise a combination of computer-executable instructions and hardware.

As mentioned above, and as shown in FIG. 3, the digital editing manager 304 includes a display manager 306. The display manager 306 provides, manages, and/or controls a graphical user interface (or simply "user interface") that allows a user to edit digital images. For example, the display manager 306 provides a user interface that facilitates interactions with a display. Likewise, the display manager 306 provides a user interface that displays information provided by other components 308-314 of the digital editing manager 304.

More specifically, the display manager 306 facilitates the display of a user interface (e.g., by way of a display device associated with the client-computing device 302). For example, the user interface is composed of a plurality of graphical components, objects, and/or elements that allow a user to interact with the digital editing manager 304. More particularly, the display manager 306 directs the client-computing device 302 to display a group of graphical components, objects, and/or elements as directed by the digital editing manager 304.

As further illustrated in FIG. 3, the digital editing manager 304 includes an input detector 308. In one or more embodiments, the input detector 308 detects, receives, and/or facilitates user input in any suitable manner. In some examples, the input detector 308 detects one or more user interactions with respect to the user interface. As referred to herein, a "user interaction" means a single interaction, or combination of interactions, received from a user by way of one or more input devices.

For example, the input detector 306 detects a user interaction from a keyboard, mouse, touch pad, touch screen, and/or any other input device. In the event the client-computing device 302 includes a touch screen, the input detector 308 detects one or more touch gestures (e.g., swipe gestures, tap gestures, pinch gestures, or reverse pinch gestures, etc.) from a user that forms a user interaction. In some examples, a user provides the touch gestures in relation to and/or directed at one or more graphical objects or graphical elements of a user interface.

The input detector 308 may additionally, or alternatively, receive data representative of a user interaction. For example, the input detector 308 receives one or more user configurable parameters from a user, one or more user commands from the user, and/or any other suitable user input. The input detector 308 may also receive input data from one or more components of the digital editing manager 304.

The digital editing manager 304 performs one or more functions in response to the input detector 308 detecting user input and/or receiving other data. Generally, a user can control, navigate, and otherwise use the digital editing manager 304 by providing one or more user inputs that the input detector 308 can detect. For example, in response to the input detector 308 detecting user input, the display manager 306 allows the user to view data, interact with various controls, or edit digital images. In addition, in response to the input detector 308 detecting user input, the display manager 306 allows a user to navigate through one or more user interfaces to view, edit, save, and share a digital image. For example, a user may provide input (e.g., via a button click, a list item selection, a drag-and-drop, etc.) indicating an edit to a digital image. In response to the input detector 308 detecting the input, the digital editing manager 304 takes appropriate action in response to the detected user input.

As shown in FIG. 3, the digital editing manager 304 also includes an image analyzer 310. As discussed above, in response to the user changing the underlying image associated with a digital design, the digital content creation/editing system identifies the best placement, color, and size for one or more overlays associated with the digital design. Accordingly, the image analyzer 310 performs various analyses of the underlying image associated with the digital design so that the digital content creation/editing system can identify the best placement, color, and size for an overlay.

First, the image analyzer 310 determines that a change has been made to the underlying image associated with a digital design. For example, the image analyzer 310 determines that a change has been made to the underlying image when it detects a change to a color palette of the underlying, a change to the size of the underlying image, a change to the format of the underlying image, a change to the source file of the underlying image, etc. If the image analyzer 310 determines that a change has been made to the underlying image in any of these ways, the image analyzer 310 can then begin the process of identifying the optimal placement, color, and size for the overlay associated with the digital design.

Thus, in order to perform the needed analyses, the image analyzer 310 divides the underlying image into a plurality of potential placements. As described above, in one embodiment, the image analyzer 310 divides the underlying image into regular intervals (e.g., a grid pattern). Alternatively, the image analyzer 310 divides the underlying image into non-regular intervals (e.g., based on quadrants, blank space, etc.).

The image analyzer 310 then performs various analyses of each of the plurality of potential placements such that the digital content creation/editing system can calculate a weighted placement score for each of the plurality of potential placements. For example, for each potential placement within a digital design, the image analyzer 310 performs edge detection, facial detection, symmetry detection, size detection, alignment detection, and overlap detection relative to the underlying image associated with the digital design, as described above. Thus, the image analyzer 310 gathers all the information needed by the digital content creation/editing system in order to calculate a weighted placement score for any potential placement within a digital design.

Additionally, the image analyzer 310 extracts a color palette from the digital design. For example, as described above, the digital content creation/editing system determines optimal color for an overlay in a digital design. In one or more embodiments, the digital content creation/editing system changes the text color, backing shape color, border color, and any other color associated with an overlay in response to a detected change to the digital design. Accordingly, in response to a change to the underlying image of the digital design, the image analyzer 310 extracts one or more colors from the changed underlying image.

In at least one embodiment, the image analyzer 310 extracts one or more colors from a changed underlying image by extracting all colors from the changed underlying image and then determining which extracted colors are most prominent within the changed underlying image. For example, in one or more embodiments, the image analyzer 310 extracts all colors from the changed underlying image and identifies a number of pixels or areas within the changed underlying image that are covered by each of the extracted colors. The image analyzer 310 then identifies the extracted colors that are associated with the highest percentage of pixels or areas. In some embodiments, the extracted color palette is made of only the extracted colors with coverage percentages above a threshold amount. In other embodiments, the extracted color palette is made of the top five extracted colors based on coverage percentages.

As mentioned above, and as illustrated in FIG. 3, the digital editing manager 304 also includes a placement manager 312. In one or more embodiments, the placement manager 312 calculates a weighted placement score, based on the analyses performed by the image analyzer 310, for each potential placement within a digital design. For example, as described above, the placement manager 312 calculates scalar values for each potential placement in a digital design based on one or more edges within the potential placement relative to the replacement underlying image, one or more faces detected within the potential placement relative to the replacement underlying image, the symmetry of the potential placement relative to the replacement underlying image, the size of the potential placement relative to the replacement underlying image, the alignment of the potential placement relative to the replacement underlying image, and any overlap of the potential placement with one or more objects within the replacement underlying image.

The placement manager 312 also weights the scalar values associated with various features of a potential placement. For example, as described above, in some embodiments, the digital content creation/editing system places a high priority on facial detection. Accordingly, in that case, the placement manager 312 weights the scalar value calculated based on facial recognition for a potential placement such that the potential placement is further penalized if a face is found within the potential placement, or further bolstered if a face is not found within the potential placement.

Furthermore, the placement manager 312 also identifies an optimal placement for an overlay by identifying the highest scoring potential placement within a digital design. As described above, the placement manager 312 utilizes all the weighted scalar values calculated for a particular potential placement to determine an overall placement score for the particular potential placement (e.g., by adding or averaging). Next, the placement manager 312 identifies the potential placement with the highest overall placement score as the optimal placement for the overlay relative to the underlying image in the digital design.

Once the placement manager 312 identifies the optimal placement, the placement manager 312 redraws the digital design such that the overlay is moved to the optimal placement. For example, in one embodiment, redrawing the digital design involves disassociating an overlay from the digital design and then re-associating the overlay with the digital design such that the overlay is now in the optimal placement. Alternatively, if the overlay is associated with placement coordinates, the placement manager 312 can simply edit the placement coordinates such that the overlay is moved to the optimal placement.

The placement manager 312 also determines whether one or more colors associated with the overlay need to change in light of the new optimal placement of the overlay. For example, as described above, it is possible that one or more colors of the overlay can interact with one or more colors of a portion of the underlying image in the optimal placement to result in a loss of readability or aesthetic value. Accordingly, the placement manager 312 determines whether there has been a loss of readability and/or aesthetic value using one or more rules, guidelines, and various design principles to determine whether to change one or more colors in the overlay to maximize readability and visual aesthetic.

Additionally, the placement manager 312 determines whether one or more colors associated with the overlay need to change in light of the extracted color palette from the underlying image, as described above. In order to keep the digital design within established style guidelines, the placement manager 312 changes one or more colors associated with the overlay such that the overlay does not clash with one or more colors associated with the underlying image. Accordingly, in one or more embodiments, the placement manager 312 changes a color associated with the text, backing shape, and/or border of the overlay to match or correlate with a color from the extracted color palette of the underlying image. The placement manager 312 utilizes the extracted color palette in such a way as to not negatively impact readability of any text within the overlay.

Furthermore, the placement manager 312 determines whether the size of the overlay should change based on its new placement within the digital design. For example, as discussed above, in order to maximize readability and visual aesthetic, the placement manager 312 determines whether the size of an overlay can be changed once it has been placed in its optimal placement. In response to determining that the size of the overlay can be changed, the placement manager 312 can redraw the overlay such that it is larger or smaller based on the determination.

Also as mentioned above, and as illustrated in FIG. 3, the digital editing manager 304 includes a data storage 314. The data storage 314 can store and maintain image data 316 and placement data 318. In one or more embodiments, the image data 316 is representative of image information, such as described herein. Also, in one or more embodiments, the placement data 318 is representative of optimal placement information, such as described herein.

Figure 4:
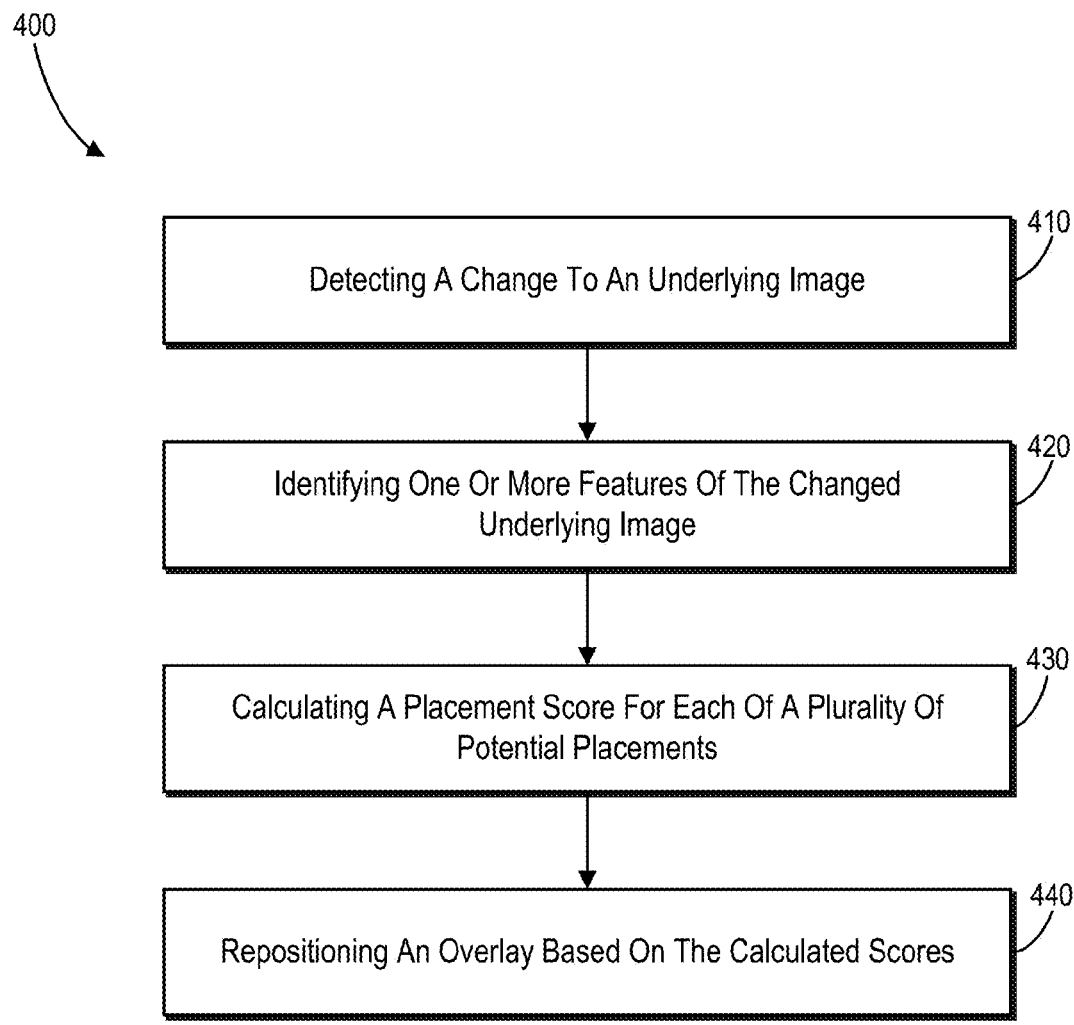
FIG. 4 illustrates a flowchart of a series of acts in a method of determining the placement, color, and size for an overlay relative to an underlying image in a digital design in accordance with one or more embodiments.

FIGS. 1A-3, the corresponding text, and the examples provide a number of different methods, systems, and devices for procedurally generating sets of probabilistically distributed styling values and styling combinations. In addition to the foregoing, embodiments can also be described in terms of flowcharts comprising acts and steps in a method for accomplishing a particular result. For example, FIG. 4 illustrates a flowchart illustrating acts and steps in a method of determining the optimal placement, color, and size for an overlay relative to an underlying image in a digital design. One will appreciate in light of the disclosure herein that the method may be performed with less or more steps/acts or the steps/acts may be performed in differing orders. Additionally, the steps/acts described herein may be repeated or performed in parallel with one another or in parallel with different instances of the same or similar steps/acts.

FIG. 4 illustrates a flowchart of one example method 400 of determining the optimal placement for an overlay in a digital design. The method 400 includes an act 410 of detecting a change to an underlying image. In particular, the act 410 involves detecting a change to an underlying image (e.g., the underlying image 108a as shown in FIGS. 1E and 1F) of a digital design comprising an overlay (e.g., the overlay 110 as shown in FIGS. 1E and 1F). In one or more embodiments, detecting a change to the underlying image includes detecting a change to one or more of a color palette of the underlying image, a size of the underlying image, a format of the underlying image, or a source file of the underlying image.

The method 400 also includes an act 420 of identifying one or more features of the changed underlying image. In particular, the act 420 involves identifying, in response to the detected change, one or more features of the changed underlying image (e.g., as shown in FIG. 1E). In one or more embodiments, identifying, in response to the detected change, one or more features of the changed underlying image includes performing one or more of edge detection or facial recognition on the changed underlying image.

The method 400 further includes an act 430 of calculating a placement score for each of a plurality of potential placements. In particular, the act 420 involves calculating a placement score for each of a plurality of potential placements relative to the changed underlying image by scoring an effect on the identified one or more features of the changed underlying image due to positioning of the overlay in each of the potential placements. In one or more embodiments, calculating the placement score for each of the plurality of potential placements relative to the changed underlying image by scoring the effect on the identified one or more features of the changed underlying image due to positioning of the overlay in each of the potential placements includes identifying faces or edges that falls with each of the potential placements and scoring the effect of the overlay on the identified faces or edges within a given potential placement.

In some embodiments, calculating a placement score for each of a plurality of potential placements relative to the changed underlying image by scoring an effect on the identified one or more features of the changed underlying image due to positioning of the overlay in each of the potential placements includes calculating a plurality of scalar values, each scalar value indicating an effect of positioning the overlay in a given potential placement, and summing the plurality of scalar values for each potential placement. For example, calculating a plurality of scalar values includes calculating an edge scalar value indicating how the overlay overlaps with edges of the changed underlying image when positioned in a given potential placement. Alternatively, in one embodiment, calculating a plurality of scalar values includes calculating a face scalar value indicating how the overlay overlaps with faces of the changed underlying image when positioned in a given potential placement. Alternatively, in yet another embodiment, calculating a plurality of scalar values includes calculating a symmetry scalar value indicating how the overlay, when positioned in a given potential placement, affects the symmetry of the digital design. Alternatively, in yet another embodiment, calculating a plurality of scalar values comprises calculating an alignment scalar value indicating how the overlay, when positioned in a given potential placement, aligns with objects in the digital design.

The method 400 further includes an act 440 of repositioning the overlay based on the calculated placement scores. In particular, the act 440 involves repositioning the overlay at a potential placement with a highest placement score (e.g. as illustrated in FIG. 1F). In one or more embodiments, the method 400 further includes acts of identifying one or more colors associated with the overlay, and one or more colors associated with a portion of the underlying image that falls underneath the potential placement with the highest placement score, determining whether the one or more colors associated with the overlay adversely affects readability of text within the digital design, and changing, based on the determination, the one or more colors associated with the overlay to increase the readability of the text within the digital design. In additional or alternative embodiments, the method 400 also includes acts of identifying a size associated with the overlay, determining whether the size associated with the overlay adversely affects readability of text within the digital design, and changing, based on the determination, the size associated with the overlay to increase the readability of the text within the digital design.

Figure 5:
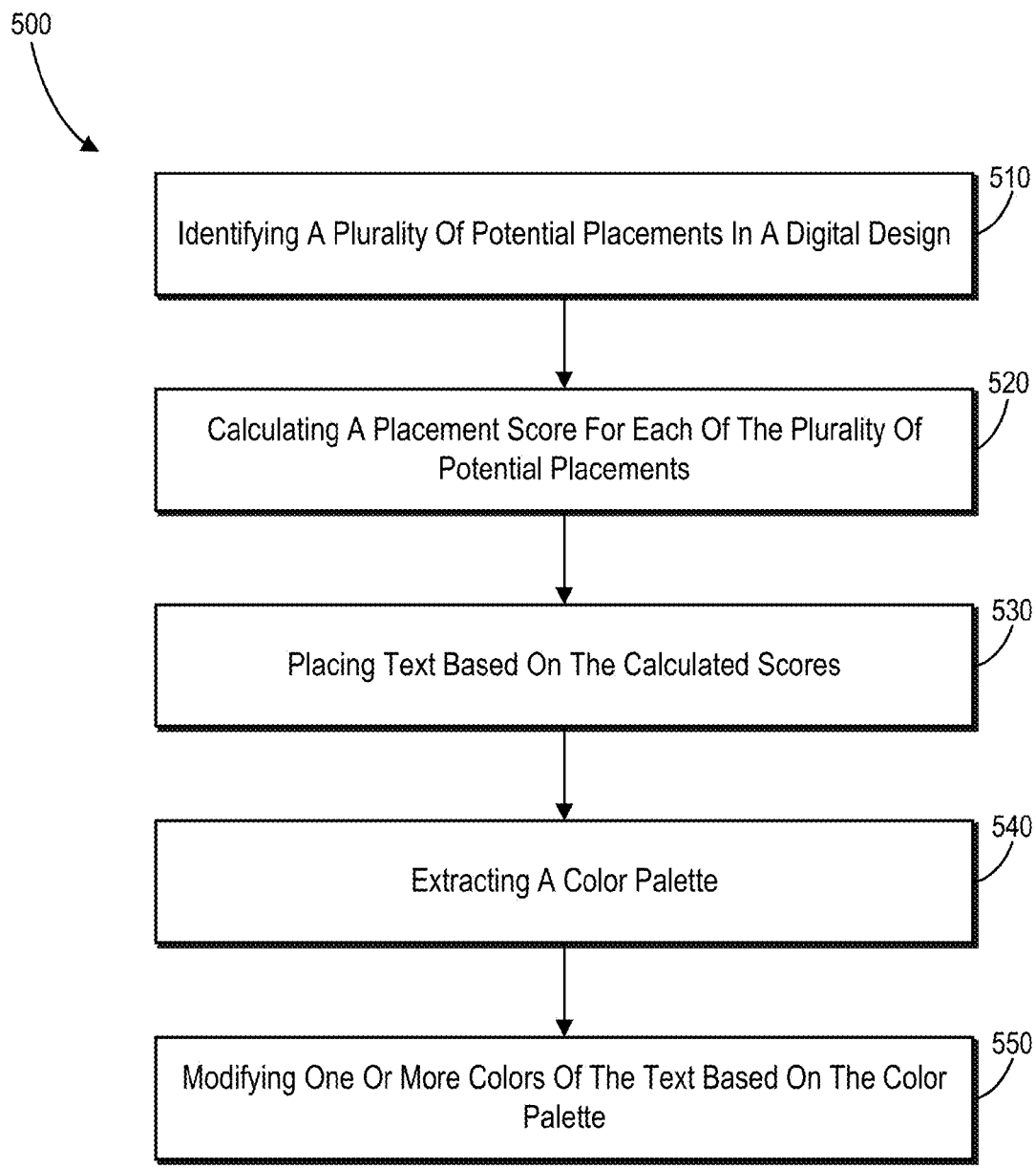
FIG. 5 illustrates another flowchart of a series of acts in a method of determining the placement, color, and size for an overlay relative to an underlying image in a digital design in accordance with one or more embodiments.

FIG. 5 illustrates a flowchart of another example method 500 of determining the optimal placement of an overlay in a digital design. The method 500 includes an act 510 of identifying a plurality of potential placements in a digital design. In particular, the act 510 involves identifying a plurality of potential placements in a digital design (e.g., the editable digital design 104a as shown in FIG. 1B) for text (e.g., as shown in the overlay 110 in FIG. 1B) relative to an underlying image (e.g., the underlying image 108 as shown in FIG. 1B) of the digital design. For example, in at least one embodiment, identifying a plurality of potential placements comprises dividing the editable the digital design into a grid.

The method 500 further includes an act 520 of calculating a placement score for each of a plurality of potential placements. In particular, the act 530 involves calculating a placement score for each of the plurality of potential placements that indicates an effect of positioning the text in each of the potential placements. For example, in at least one embodiment, calculating a placement score for each of the potential placements includes calculating the placement score based on one or more of the performed edge detection, facial recognition, symmetry detection, size detection, alignment detection, and overlap detection.

Additionally, the method 500 includes an act 530 of placing the text based on the calculated placement scores. In particular, the act 530 involves placing the text at a potential placement with a highest calculated placement score (e.g., as illustrated in FIG. 1F). For example, placing the text at the potential placement with the highest calculated placement score includes redrawing the digital design with the text at the potential placement with the highest calculated placement score.

In at least one embodiment, the method 500 includes an act of identifying one or more features of the digital design. For example, identifying one or more features of the digital design includes performing one or more of edge detection, facial recognition, symmetry detection, size detection, alignment detection, or overlap detection.

The method 500 further includes an act 540 of extracting a color palette. In particular, the act 540 involves extracting a color palette from the underlying image. The method 500 also includes an act 550 of modifying one or more colors of the text. In particular, the act 550 involves modifying one or more colors of the text to correspond to the extracted color palette. In some embodiments, the method 400 includes an act of determining whether the one or more colors of the text adversely affects readability of the text, wherein modifying the one or more colors of the text further includes changing an opacity, shade, or hue of the one or more colors to increase readability of the text. Additionally, in at least one embodiment, the method 400 includes acts of determining whether a size of the text adversely affects readability of the text, and changing, based on the determination, the size of the text to increase readability of the text.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
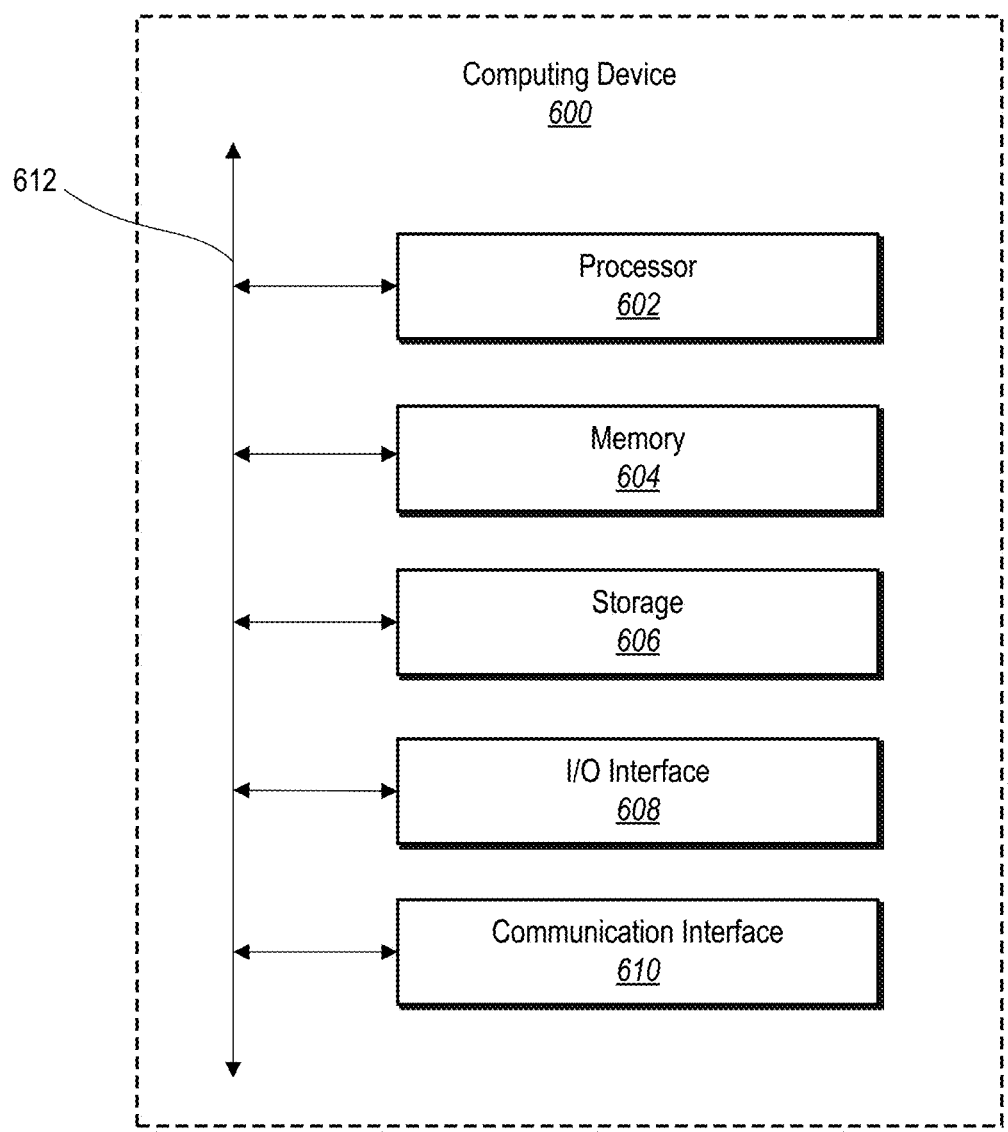
FIG. 6 illustrates a block diagram of an exemplary computing device in accordance with one or more embodiments.

FIG. 6 illustrates a block diagram of an exemplary computing device 600 that may be configured to perform one or more of the processes described above. One will appreciate that one or more computing devices such as the computing device 600 may implement the digital content creation/ editing system. As shown by FIG. 6, the computing device 600 can comprise a processor 602, memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In particular embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In particular embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, the storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In particular embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from the computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications via various communication protocols. Examples of communication protocols that may be used include, but are not limited to, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML"), JavaScript Object Notation ("JSON"), and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 7:
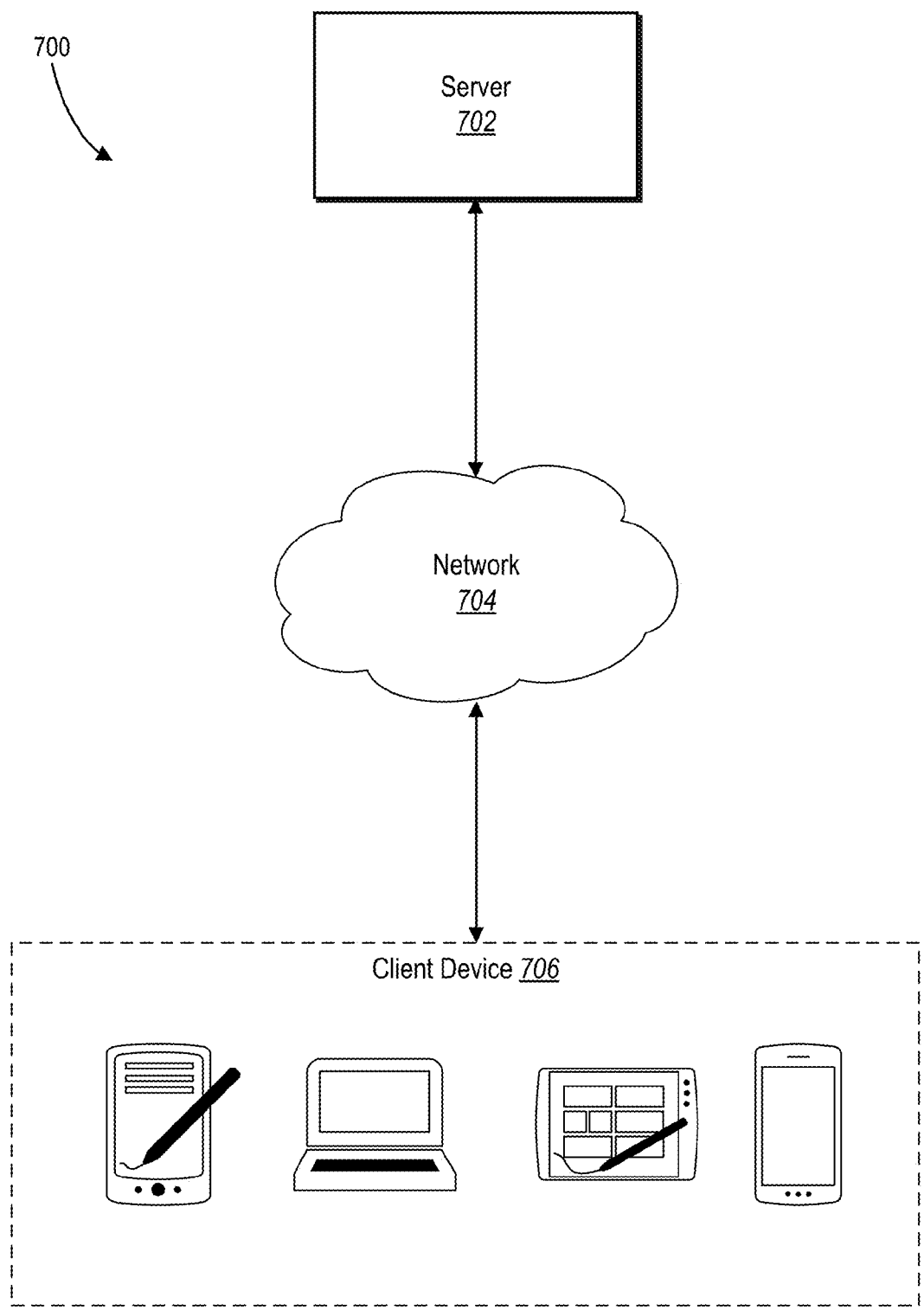
FIG. 7 is an example network environment in which the digital content creation/editing system can operate in accordance with one or more embodiments.

FIG. 7 illustrates an example network environment 700 of in which the server 304 can operate. The network environment 700 includes a client system 706, and a server 702 connected to each other by a network 704. Although FIG. 7 illustrates a particular arrangement of the client system 706, the server 702, and the network 704, this disclosure contemplates any suitable arrangement of the client system 706, the server 702, and the network 704. As an example and not by way of limitation, the client system 706 and the server 702 may be connected to each other directly, bypassing network 704. As another example, the client system 706 and the server 702 may be physically or logically co-located with each other in whole or in part. Moreover, although FIG. 7 illustrates a particular number of client systems 706, servers 702, and networks 704, this disclosure contemplates any suitable number of client systems 706, servers 702, and networks 704. As an example and not by way of limitation, network environment 700 may include multiple client system 706, servers 702, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client system 706 and the server 702 to the communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 706 may be an electronic device including hardware, software, or embedded logic components or a combination of two or more such components and capable of carrying out the appropriate functionalities implemented or supported by client system 706. As an example and not by way of limitation, a client system 706 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 706. A client system 706 may enable a network user at client system 706 to access network 704. A client system 706 may enable its user to communicate with other users at other client systems 706.

In particular embodiments, client system 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 706 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 706 one or more Hyper Text Markup Language (HTML) files responsive to the HTTP request. Client system 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server 702 may be capable of linking a variety of entities. As an example and not by way of limitation, server 702 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating the server 702. In particular embodiments, however, the server 702 and third-party systems may operate in conjunction with each other to provide analytics services to users of the server 702 or third-party systems. In this sense, server 702 may provide a platform, or backbone, which other systems, such as third-party systems, may use to provide analytic or data/tracking services and functionality to users across the Internet.

In particular embodiments, a third-party system may include a third-party content object provider. A third-party content object provider may include one or more sources of content objects, which may be communicated to a client system 706. As an example and not by way of limitation, content objects may include information regarding things or activities of interest to the user, such as, for example, digital media, digital designs, digital photographs, digital videos, digital audio, clip art, fonts, etc. As another example and not by way of limitation, content objects may include metadata that describes the content objects.

In particular embodiments, server 702 may include a variety of servers, sub-systems, programs, modules, logs, and data stores. In particular embodiments, server 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server 702 may also include suitable components such as network interfaces, security mechanisms, load balancers, failover servers, management-and-network-operations consoles, other suitable components, or any suitable combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for editing digital images, a method for automatically repositioning overlays in digital designs upon changing of underlying images in the digital designs comprising:
   detecting a replacement of a source file of an underlying image of a digital design with a source file of a new underlying image, the digital design comprising an overlay including text;
   performing edge detection, in response to the detected replacement of the source file of the underlying image of the digital design with the source file of the new underlying image, on the new underlying image to determine a location of one or more visual edges in the new underlying image;
   determining, by at least one processor, a placement score for each of a plurality of potential placements of the overlay relative to the new underlying image based on an amount that the overlay overlaps the one or more visual edges in each of the potential placements; and
   repositioning the overlay over the new underlying image at a potential placement with a highest placement score.

2. The method as recited in claim 1, further comprising detecting a change between one or more of a color palette of the underlying image and a color palette of the new underlying image, a size of the underlying image and a size of the new underlying image, or a format of the underlying image and a format of the new underlying image.

3. The method as recited in claim 1, further comprising, in response to the detected replacement of the source file of the underlying image of the digital design with the source file of the new underlying image, facial recognition on the new underlying image.

4. The method as recited in claim 3, wherein determining the placement score for each of the plurality of potential placements of the overlay relative to the new underlying image is further based on an amount that the overlay overlaps one or more identified faces.

5. The method as recited in claim 4, further comprising:
   identifying one or more colors associated with the overlay, and one or more colors associated with a portion of the new underlying image that falls underneath the potential placement with the highest placement score;
   determining whether the one or more colors associated with the overlay adversely affects readability of the text of the overlay; and
   changing, based on the determination, the one or more colors associated with the overlay to increase the readability of the text.

6. The method as recited in claim 5, further comprising:
   identifying a size associated with the overlay;
   determining whether the size associated with the overlay adversely affects readability of text; and
   changing, based on the determination, the size associated with the overlay to increase the readability of the text.

7. The method as recited in claim 4, wherein determining, by at least one processor, a placement score for each of a plurality of potential placements of the overlay relative to the new underlying image based on an amount that the overlay overlaps the one or more visual edges in each of the potential placements further comprises:
   calculating a plurality of scalar values, each scalar value indicating an effect of positioning the overlay in a given potential placement; and
   summing the plurality of scalar values for each potential placement.

8. The method as recited in claim 7, wherein calculating a plurality of scalar values comprises calculating an edge scalar value indicating how the overlay overlaps the one or more visual edges of the new underlying image when positioned in a given potential placement.

9. The method as recited in claim 7, wherein calculating a plurality of scalar values further comprises calculating a face scalar value indicating how the overlay overlaps with faces of the new underlying image when positioned in a given potential placement.

10. The method as recited in claim 7, wherein calculating a plurality of scalar values further comprises calculating a symmetry scalar value indicating how the overlay, when positioned in a given potential placement, affects the symmetry of the digital design.

11. The method as recited in claim 7, wherein calculating a plurality of scalar values further comprises calculating an alignment scalar value indicating how the overlay, when positioned in a given potential placement, aligns with objects in the digital design.

12. A non-transitory computer-readable medium storing instructions thereon that, when executed by at least one processor, cause a computer system to:
 detect a replacement of a source file of an underlying image of a digital design with a source file of a new underlying image, the digital design comprising an overlay;
 perform edge detection, in response to the detected replacement of the source file of the underlying image of the digital design with the source file of the new underlying image, on the new underlying image to determine a plurality of potential placements in the digital design for text relative to one or more visual edges in the new underlying image of the digital design;
 determine a placement score for each of the plurality of potential placements that indicates an effect of positioning the text in each of the potential placements relative to one or more visual edges in the new underlying image of the digital design;
 place the text over the new underlying image at a potential placement with a highest calculated placement score;
 extract a color palette from the new underlying image; and
 modify one or more colors of the text to correspond to the extracted color palette.

13. The non-transitory computer-readable medium as recited in claim 12, wherein the instructions, when executed by the at least one processor, cause the computer system to perform edge detection to determine a plurality of potential placements by dividing the digital design into a grid.

14. The non-transitory computer-readable medium as recited in claim 12, further storing instructions thereon that, when executed by the at least one processor, cause the computer system to identify one or more features of the digital design.

15. The non-transitory computer-readable medium as recited in claim 14, wherein the instructions, when executed by the by the at least one processor, cause the computer system to identify the one or more features of the digital design by performing one or more of facial recognition, symmetry detection, size detection, alignment detection, or overlap detection.

16. The non-transitory computer-readable medium as recited in claim 15, wherein the instructions, when executed by the by the at least one processor, cause the computer system to determine the placement score for each of the potential placements by calculating the placement score based on one or more of the performed facial recognition, symmetry detection, size detection, alignment detection, or overlap detection.

17. The non-transitory computer-readable medium as recited in claim 12, further storing instructions thereon that, when executed by the at least one processor, cause the computer system to:
 determine whether the one or more colors of the text adversely affects readability of the text; and
 modify the one or more colors of the text further by changing an opacity, shade, or hue of the one or more colors to increase readability of the text.

18. The non-transitory computer-readable medium as recited in claim 12, further storing instructions thereon that, when executed by the at least one processor, cause the computer system to:
 determine whether a size of the text adversely affects readability of the text; and
 change, based on the determination, the size of the text to increase readability of the text.

19. A system comprising:
 at least one processor; and
 at least one non-transitory computer-readable storage medium storing instructions thereon that, when executed by the at least one processor, cause the system to:
 detect a replacement of a source file of an underlying image of a digital design with a source file of a new underlying image, the digital design comprising an overlay including text;
 perform edge detection, in response to the detected replacement of the source file of the underlying image of the digital design with the source file of the new underlying image, on the new underlying image to determine a location of one or more visual edges in the new underlying image;
 determine a placement score for each of a plurality of potential placements relative to the new underlying image based on an amount that the overlay overlaps the one or more visual edges in each of the potential placements;
 reposition the overlay over the new underlying image at a potential placement with a highest placement score;
 modify one or more colors of the repositioned overlay based on an extracted color palette from the new underlying image; and
 modify a size of the repositioned overlay based on readability of the repositioned overlay.

20. The system as recited in claim 19, wherein determining a placement score for each of the plurality of potential placements relative to the new underlying image further comprises identifying one or more features of the digital design by performing one or more of facial recognition, symmetry detection, size detection, alignment detection, or overlap detection.

* * * * *